United States Patent
Sato et al.

(10) Patent No.: US 11,450,485 B2
(45) Date of Patent: Sep. 20, 2022

(54) SOLID ELECTROLYTIC CAPACITOR

(71) Applicant: NIPPON CHEMI-CON CORPORATION, Tokyo (JP)

(72) Inventors: Kenta Sato, Fukushima (JP); Masao Sakakura, Fukushima (JP)

(73) Assignee: NIPPON CHEMI-CON CORPORATION

( * ) Notice: Subject to any disclaimer, the term of this patent is extended or adjusted under 35 U.S.C. 154(b) by 0 days.

(21) Appl. No.: 17/256,954

(22) PCT Filed: Jul. 17, 2019

(86) PCT No.: PCT/JP2019/028020
§ 371 (c)(1),
(2) Date: Dec. 29, 2020

(87) PCT Pub. No.: WO2020/017530
PCT Pub. Date: Jan. 23, 2020

(65) Prior Publication Data
US 2021/0142952 A1   May 13, 2021

(30) Foreign Application Priority Data
Jul. 18, 2018 (JP) .............................. JP2018-135348

(51) Int. Cl.
*H01G 9/28* (2006.01)
*H01G 9/15* (2006.01)
(Continued)

(52) U.S. Cl.
CPC .............. *H01G 9/028* (2013.01); *H01G 9/035* (2013.01); *H01G 9/145* (2013.01); *H01G 9/15* (2013.01)

(58) Field of Classification Search
CPC .......... H01G 9/145; H01G 9/15; H01G 9/035; H01G 9/028
See application file for complete search history.

(56) References Cited

U.S. PATENT DOCUMENTS 6,307,735 B1 * 10/2001 Saito .................. H01G 9/025
361/517
2009/0109602 A1   4/2009 Kakuma et al.
(Continued)

FOREIGN PATENT DOCUMENTS

CN   201425375   3/2010
CN   107430940   12/2017
(Continued)

OTHER PUBLICATIONS

Chinese Patent Office, Office Action for corresponding Chinese Application No. 201980030730.7 & its English machine translation, dated Jul. 30, 2021, 13 pages.
(Continued)

*Primary Examiner* — David M Sinclair

(57) ABSTRACT

In a solid electrolytic capacitor having an electrolyte layer consisting of a solid electrolyte layer and a liquid, the solid electrolytic capacitor, which suppresses a dedoping reaction and which ESR thereof does not keenly increase, in particular, after a loading of heat stress, is provided. In the solid electrolytic capacitor, the electrolyte layer is formed in the capacitor element which is formed by opposing an anode foil and a cathode foil. This electrolyte layer includes the solid electrolyte layer and the liquid. The solid electrolyte layer includes a conductive polymer consisting of a dopant and a conjugated polymer. The liquid is filled in air gaps in the capacitor element on which the solid electrolyte layer is formed. A molecular ratio of a cation component relative to 1 mol of a functional group which can contribute to a doping reaction of the dopant, in the electrolyte layer is 6 or less.

12 Claims, 5 Drawing Sheets

(51) Int. Cl.
*H01G 9/145* (2006.01)
*H01G 9/035* (2006.01)
*H01G 9/028* (2006.01)

(56) References Cited

U.S. PATENT DOCUMENTS

| | | | |
|---|---|---|---|
| 2015/0213962 A1 | 7/2015 | Koseki et al. | |
| 2016/0099113 A1* | 4/2016 | Komatsu | H01G 9/025 |
| | | | 361/525 |
| 2016/0336117 A1* | 11/2016 | Koseki | H01G 9/151 |
| 2017/0256362 A1* | 9/2017 | Tsubaki | H01G 9/028 |
| 2017/0372843 A1 | 12/2017 | Matsumoto | |
| 2020/0203081 A1* | 6/2020 | Saito | H01G 9/145 |

FOREIGN PATENT DOCUMENTS

| | | | |
|---|---|---|---|
| EP | 2881958 | | 6/2015 |
| JP | 2003-100559 | | 4/2003 |
| JP | 2009-111174 | | 5/2009 |
| JP | 2016-114540 | | 6/2016 |
| JP | 2017-199929 | | 11/2017 |
| JP | 2018110233 | | 7/2018 |
| KR | 20020029961 A | * | 4/2002 |
| WO | WO2014/021333 | | 7/2016 |

OTHER PUBLICATIONS

European Patent Office, Office Action for corresponding European Patent Application No. 19836952.2, dated Oct. 25, 2021, 6 pages.

\* cited by examiner

SOLID ELECTROLYTIC CAPACITOR

FIELD OF INVENTION

The present disclosure relates to a solid electrolytic capacitor.

BACKGROUND

In electrolytic capacitors utilizing valve action metal such as tantalum and aluminum, etc., by making the valve action metal as the anode electrode into shapes of a sintered body or an etching foil, etc., to enlarge the surface of dielectric, the electrolytic capacitors can be in a small size and have a large capacity. In particular, a solid electrolyte capacitor in which the dielectric oxide film is covered by the solid electrolyte is in a small size, has a large capacity, is a low equivalent series resistor, and is required for downsizing, high functionality, and reducing cost thereof.

As solid electrolytes, manganese dioxide, 7,7,8,8-tetra-cyanoquinodimetane (TCNQ) complex, etc., are known. In recent years, conductive polymers which are derived from monomers having π conjugated double bonds, such as poly(3,4-ethylenedioxythiophene) which has excellent adhesion to the dielectric oxide film, etc., are rapidly becoming common as solid electrolyte. For the conductive Polyanions such as organic sulfonic acid, etc., are used as a dopant at the time of chemical oxidative polymerization or electrolytic oxidative polymerization, and high conductivity is expressed.

However, compared to a liquid electrolytic capacitor in which the capacitor element is impregnated with the electrolytic solution and which does not have the solid electrolyte layer, the solid electrolytic capacitor lacks function of repairing the defective portion of the dielectric oxide film, and there is a consideration that the leakage current increases. Accordingly, a so-called hybrid-type solid electrolytic capacitor in which the solid electrolyte layer is formed on the capacitor element, in which the anode foil and the cathode foil is facing each other, while impregnating the air gaps of the capacitor element with the electrolytic solution is getting attention.

PRIOR ART DOCUMENT

Patent Document

Patent Document 1: Japanese Patent Application Laid-Open Publication 2006-114540

SUMMARY OF INVENTION

Problems to be Solved by Invention

In the solid electrolytic capacitor which uses the combination of the solid electrolyte and the electrolytic solution, the conductivity thereof gets worse by the dedoping reaction of the dopants and the Equivalent Series Resistance (ESR) of the solid electrolytic capacitor increases. Regarding this increase in ESR along with the dedoping reaction, Patent Document 1 reports that the dedoping reaction can be suppressed by the excessive acids in the molecular ratio of the acid component and the base component that are the solute component of the electrolytic solution. This report assumes that the dedoping reaction is suppressed because the equilibrium of the dopant that is the acid component and the acid component in the electrolytic solution is maintained.

However, the heat stress may be given to the solid electrolytic capacitor, for example, when the solid electrolytic capacitor is used under the high temperature environment (for example, 115° C. or more), or in the reflow soldering process to apply the solid electrolytic capacitor to the substrate. This heat stress facilitates the dedoping reaction even when the solute component in the electrolytic solution is acid excessive. Therefore, ESR of the solid electrolytic capacitor keenly increases after the loading of the heat stress.

The present disclosure is suggested to address the above problem and the objective is to provide the solid electrolytic capacitor which ESR thereof does not keenly increase even after the loading of the heat address, among the solid electrolytic capacitor which has solid electrolytes and the solution as the electrolyte.

Means to Solve the Problem

The inventors produced the solid electrolytic capacitors in which an amount of cation components is fixed and an amount of anion component is changed, and the solid electrolytic capacitors in which an amount of cation components is changed and an amount of anion component is fixed, performed a reflow process to load heat stress to theses the solid electrolytic capacitors, and measured ESR before and after the loading of the heat stress. Note that the leftmost result in FIG. 1 (described as "cation only" in FIG. 1) is an example in which azelaic acid that is the anion component is not added and only triethylamine that is the cation component is added. As a result, as illustrated in FIG. 1, it was found that changes in ESR of each of the solid electrolytic capacitors in which the amount of cations is fixed before and after the loading of the heat stress had similar tendency, and there were large changes and small changes in ESR of each of the solid electrolytic capacitors in which the amount of anions is fixed before and after the loading of the heat stress. The inventors found from this result that the changes in ESR produced before and after the loading of the heat stress were determined by the amount of cation components included in the electrolyte layers rather than the effect of pH and the ratio of acid and base.

Accordingly, a solid electrolytic capacitor of the present disclosure is based on this discovery, and includes:
  a capacitor element formed by opposing an anode foil and
    a cathode foil; and
  an electrolyte layer formed in the capacitor element, in
    which:
  the electrolyte layer includes:
  a solid electrolyte layer including a dopant and a conjugated polymer; and
  a liquid filled in air gaps in the capacitor element on which
    the solid electrolyte layer is formed, and
  a molecular ratio of a cation component relative to 1 mol
    of a functional group which can contribute to a doping
    reaction of the dopant, in the electrolyte layer is 6 or
    less.

The cation component may be included only in the liquid, and the molecular ratio of the cation component relative to 1 mol of the functional group may be 6 or less.

The cation component may be included in both the electrolyte layer and the liquid, and the molecular ratio of a total of the cation component in the electrolyte layer and the liquid relative to 1 mol of the functional group may be 6 or less.

The molecular ratio of the cation component relative to 1 mol of the functional group in the electrolyte layer may be 3.5 or less.

The molecular ratio of the cation component relative to 1 mol of the functional group in the electrolyte layer may be 2.8 or less.

The dopant may be polystyrene sulfonic acid.

The liquid may be ethylene glycol, γ-butyrolactone, or both.

50% or more of the liquid may be ethylene glycol.

Effect of Invention

According to the present disclosure, the solid electrolytic capacitor using the combination of the solid electrolyte and the liquid can suppress the dedoping reaction of the conjugated polymer and can achieve the excellent ESR, and since the heat stability is high, the increase in ESR after the loading of the heat stress can be suppressed.

DESCRIPTION OF PREFERRED EMBODIMENT

Figure 1:
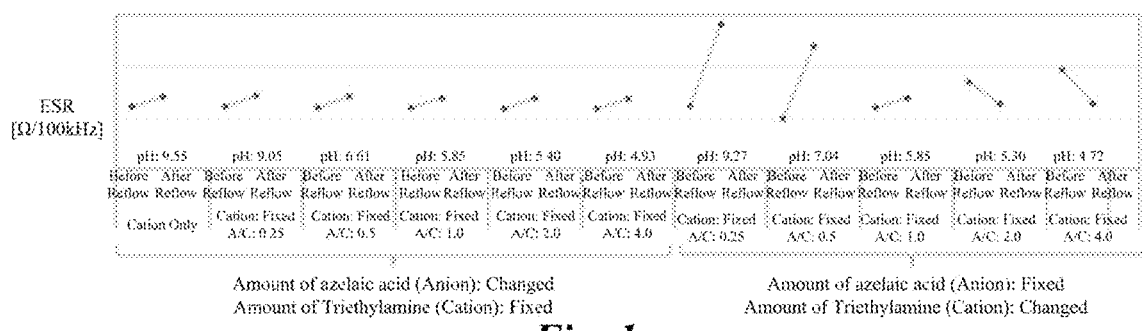
FIG. 1 is a graph illustrating a relationship between a ratio of an anion (acid) component and a cation (base) component included in liquid, and a change in ESR before and after a reflow.

In below, a solid electrolytic capacitor according to embodiments of the present disclosure is described. Note that the solid electrolytic capacitor is, for example, in a wound-type or stacked-type shapes. Although in the present embodiments, the wound-type is described as an example, the solid electrolytic capacitor according to the present disclosure is not limited thereto, and embodiments describing others are also not limited thereto.

A solid electrolytic capacitor is a passive element that performs charging and discharging of electrical charge by capacitance, and is a so-called hybrid-type solid electrolytic capacitor using a combination of a solid electrolyte and a liquid. Hereinafter, the hybrid-type solid electrolytic capacitor is just referred to as the solid electrolytic capacitor.

A wound-type solid electrolytic capacitor is formed by inserting a cylindrical capacitor element into an outer case with bottom, fitting a sealing rubber to an opening of the outer case, and sealing the opening by fastening process. An electrolyte layer is formed on the capacitor element, an anode foil and a cathode foil are respectively connected to an anode lead and a cathode lead, and the anode lead and the cathode lead are drawn out from the sealing rubber.

In such solid electrolytic capacitors, the capacitor element is formed by winding the anode foil and the cathode foil via a separator. A dielectric oxide film layer is formed on a surface of the anode foil. The electrolyte layer includes a solid electrolyte layer and the liquid. The solid electrolyte layer is formed so as to cover at least a part of the dielectric oxide film layer on the surface of the anode foil. The liquid is filled in air gaps of the capacitor element on which the solid electrolyte layer is formed.

(Electrode Foil)

The anode foil and the cathode foil are a long-length foil body formed of a valve action metal. The valve action metal is, for example, aluminum, tantalum, niobium, niobium oxide, titanium, hafnium, zirconium, zinc, tungsten, bismuth, and antimon. A purity of the anode foil is preferably 99.9% or more and a purity of the cathode foil is preferably 99% or more, however, impurities such as silicon, iron, copper, magnesium, and zinc, etc., may be included.

These anode foil and cathode foil are a sintered body which was produced by sintering powders of the valve action metal or a etched foil produced by performing an etching process to an extended foil, and surfaces thereof has a porous structure. The porous structure is formed of tunnel-shape pits, spongy pits, or air gaps between dense powders. Typically, the porous structure is formed by DC etching or AC etching which apply direct current or alternating current in an acidic aqueous solution in which halogen ions such as hydrochloric acid is present, or by vapor depositing or sintering metal particles, etc., to a core. Etching process may be performed to the cathode foil.

The dielectric oxide film layer is a dielectric layer of the solid electrolyte capacitor, and typically is an oxide film formed on a surface layer of the anode foil. If the anode foil is aluminum, the dielectric oxide film layer is an aluminum oxide layer which is an oxidized porous structure region. This dielectric oxide film layer is formed by applying voltage in a solution in which halogen ions are not present, such as aqueous solution of adipic acid and boric acid, etc. A thin dielectric oxide film layer may be formed also on the cathode foil if necessary, and furthermore, layers consisting of metal nitrides, metal carbides, and metal carbonitrides formed by thin film deposition method, or layers which includes carbon on the surface may be used. Dimensions of the anode foil and the cathode foil may be set arbitrary in accordance with specification of the solid electrolytic capacitor to be produced.

(Solid Electrolyte Layer)

The solid electrolyte layer includes a conjugated polymer and a dopant. The conjugated polymer or a doped conjugated polymer are also referred to as a conductive polymer. The conjugated polymer can be obtained by chemical oxidative polymerization or electrolytic oxidative polymerization of monomers having π conjugated double bonds or derivatives thereof. By performing doping reaction to the conjugated polymer, the conductive polymer expresses excellent conductivity.

As the conjugated polymer, known polymers may be used without any limitation. For example, polypyrrole, polythiophene, polyfuran, polyaniline, polyacetylene, polyphenylene, polyphenylenevinylene, polyacene, and polythiophenevinylene, etc., may be cited. These conjugated polymers may be used in single or in combination of two or more, and further may be copolymer of two or more types of monomers.

Among above conjugated polymers, the conjugated polymer formed by polymerization of thiophene or derivatives thereof is preferable, and the conjugated polymer formed by polymerization of 3,4-ethylenedioxythiophene (i.e. 2,3-dihydrothieno[3,4-b][1,4]dioxine). 3-alkylthiophene, 3-alkoxythiophene, 2-alkyl-4-alkoxythiophene, 3,4-alkylthiophene, and 3,4-alkoxythiophene, or derivatives thereof are preferable. As thiophene derivatives, compounds selected from thiophenes having substituents at third and fourth positions are preferable, and the substituents at the third and fourth positions in the thiophene ring may form a ring together with the carbons at the third and fourth positions. Number of carbons in alkyl groups and alkoxy groups is suitably 1 to 16, and in particular, the polymer of 3,4-ethylenedioxythiophene which is called EDOT, that is, poly(3,4-ethylenedioxythiophene) which is called PEDOT is particularly preferable. In addition, alkylated 3,4-ethylenedioxythiophene, which is 3,4-ethylenedioxythiophene to which alkyl group is added, may be used, and for example, methylated ethylenedioxythiophene (i.e. 2-methyl-2,3-dihydro-thieno[3,4-b][1.4]dioxine), ethylated ethylenedioxythiophene (i.e. 2-ethyl-2,3-dihydro-thieno[3,4-b][1.4]dioxine) may be cited.

As the dopant, known dopants may be used without any limitation. For example, inorganic acids such as boric acid, nitric acid, and phosphoric acid, and organic acids such as acetic acid, oxalic acid, citric acid, ascot acid, tartaric acid, squaric acid, rhodizonic acid, croconic acid, salicylic acid, p-toluenesulfonic acid, 1,2-dihydroxy-3,5-benzenesulfonic acid, methanesulfonic acid, trifluoromethanesulfonic acid, borodisalicylic acid, bisoxalateborate acid, sulfonylimide acid, dodecylbenzenesulfonic acid, propylnaphthalenesulfonic acid, and butylnaphthalenesulfonic acid may be cited. In addition, as polyanions, polyvinylsulfonic acid, polystyrenesulfonic acid, polyarylsulfonic acid, polyacrylsulfonic acid, polymethacrylsilfonic acid, poly(2-acrylamide-2-methylpropanesulfonic acid), polyisoprenesulfonic acid, polyacrylic acid, polymethacrylic acid, and polymaleic acid may be cited. The dopant may be used in single or in combination of two or more. In addition, polymer or monomer may be used.

Note that a number average molecular weight of the polyanion is preferably 1,000 to 2,000,000, and more preferably 10,000 to 500,000. It is not preferable for the number average molecular weight to be less than 1,000 because the conductivity of the conductive polymer to be obtained would be insufficient and the dispersibility thereof would decrease, and it is not preferable for the number average molecular weight to be more than 2,000,000 because the viscosity thereof increases.

For the solid electrolyte layer, for example, the mixture solution can be obtained by adding the monomer, the acid or the alkaline metal salt thereof which release the dopant, and an oxidant, stirring them until chemical oxidative polymerization is completed, and then removing the oxidant and the residual monomer by purification such as ultrafiltration, cation exchange, and anion exchange. As the oxidant, trivalent iron salt such as iron(III) p-toluenesulfonate, iron(III) naphthalenesulfonate, and iron(III) anthraquinonesulfonate, or peroxodisulfate such as peroxodisulfuric acid, ammonium peroxodisulfate, and sodium peroxodisulfate may be used, and the oxidant may be used in single or in combination of two or more. Although not strictly limited, the polymerization temperature is generally 10 to 60° C. The polymerization time is generally 10 minutes to 30 hours.

Furthermore, for the solid electrolyte layer, for example, the mixture solution can be obtained by adding the monomer and the acid or the alkaline metal salt thereof which release the dopant, performing electrolytic oxidative polymerization to them along with stirring, and then removing the residual monomer by purification such as ultrafiltration, cation exchange, and anion exchange. The electrolytic polymerization is performed by one of constant potential scheme, constant current scheme, and potential sweeping scheme. The potential of 1.0 to 1.5 V to a saturated calomel electrode is preferable in the case of the constant potential scheme, the current value of 1 to 10000 $\mu A/cm^2$ is preferable in the case of constant current scheme, and the sweeping rate of 5 to 200 mV/s in the range of 0 to 1.5 V to the saturated calomel electrode is preferable in the case of potential sweeping scheme. Although not strictly limited, the polymerization temperature is generally 10 to 60° C. The polymerization time is generally 10 minutes to 30 hours.

The formation method of the solid electrolyte layer is not particularly limited, and for example, the solid electrolyte layer may be formed by impregnating the capacitor element with a dispersion including particles or powder of the conductive polymer, and applying the conductive polymer to the dielectric oxide film layer. To facilitate the impregnation to the capacitor element, depressurizing and pressurizing may be performed, as necessary. The impregnation may be repeated for a plurality of times. A solvent of the dispersion of the conductive polymer is removed by transpiration by drying, as necessary. Heat drying and vacuum drying may be performed, as necessary.

The solvent of dispersion of the conductive polymer may be a solvent in which the particles or powder of the conductive polymer would disperse, and for example, water and organic solvent and the mixtures thereof may be used. As the organic solvent, polar solvents such as N-methyl-2-pyrrolidone, N,N-dimethylformamide, N,N-dimethylacetamide, and dimethyl sulfoxide, alcohols such as methanol, ethanol, propanol, and butanol, esters such as ethyl acetate, propyl acetate, and butyl acetate, hydrocarbons such as hexane, heptane, benzene, toluene, and xylene, carbonate compounds such as ethylene carbonate and propylene carbonate, ether compounds such as dioxane and diethyl ether, chain ethers such as ethylene glycol dialkyl ether, propylene glycol dialkyl ether, polyethylene glycol dialkyl ether, and polypropylene glycol dialkyl ether, heterocyclic compounds such as 3-methyl-2-oxazolidinone, and nitrile compounds such as acetonitrile, glutaronitrile, methoxyacetonitrile, propionitrile, and benzonitrile may be preferably exemplified.

The cation components may be added to the dispersion including the conductive polymer consisting of the conjugated polymer and the dopant. The cation component that is added to the dispersion including the conductive polymer are not particularly limited, and for example, inorganic alkalis such as sodium hydroxide, potassium hydroxide, calcium hydroxide, and ammonia, aliphatic amines such as ethylamine, diethylamine, methylethylamine, and triethylamine, aromatic amines such as aniline, benzylamine, pyrrole, imidazole, pyridine, and derivatives thereof, nitrogen-containing compounds such as N-methyl-pyrrolidone, N,N-dimethylformamide, N,N-dimethylacetamide, hexamethylphosphortriamide, N-methylpyrrolidone, N-methylformamide, and N-vinylacetamide, sodium alkoxides such as sodium methoxide and sodium ethoxide, metal alkoxides such as potassium alkoxide and calcium alkoxide, and organic alkalis such as dimethyl sulfoxide may be cited. These cation components may be used in single or in combination of two or more.

Furthermore, polyhydric alcohol may be included in the conductive polymer of the dispersion. As the polyhydric alcohols, sorbitol, ethylene glycol, diethylene glycol, triethylene glycol, polyoxyethylene glycol, glycerin, polyoxyethylene glycerin, xylitol, erythritol, mannitol, dipentaerythritol, or combinations of these two or more may be cited. Since the boiling point of the polyhydric alcohols are high, the polyhydric alcohols can remain in the solid electrolyte layer even after the drying process, and the ESR reduction effect and withstand voltage improvement effect can be obtained. Moreover, other compounds may be included. For example, common additives such as organic binders, surfactants, defoamers, coupling agents, antioxidants, and UV absorbers, etc., may be added.

(Liquid)

The liquid is filled in the air gaps of the capacitor element on which the solid electrolyte layer is formed. The liquid may be impregnated to the level which the solid electrolyte layer swells. In the impregnation process of the liquid, depressurizing and pressurizing may be performed, as necessary. The liquid is one types or combination of two or more types among types of solvents described and listed below. This liquid is used as the solvent, and may include solutes and additives described below. The liquid including the below-described solute is called the electrolytic solution.

Firstly, as the solvent, protic organic polar solvent or aprotic organic polar solvent may be cited, and may be used in single or in combination of two or more. Furthermore, as the solute, the anion component and the cation component are included. Typically, the solute is a salt of organic acid, a salt of inorganic acid salt, and a salt of the composite compound of the organic acid and the inorganic acid, and may be used in single or in combination of two or more. The acid that would be the anion and the base that would be the cation may be added separately.

As the protic organic polar solvent that is the solvent, monohydric alcohols, polyhydric alcohols, and oxyalcohol compounds, etc., may be cited. As the monohydric alcohols, ethanol, propanol, butanol, pentanol, hexanol, cyclobutanol, cyclopentanol, cyclohexanol, and benzyl alcohol may be cite. As the polyhydric alcohols and the oxyalcohol compounds, alkylene oxide adducts of polyhydric alcohols such as ethylene glycol, propylene glycol, glycerin, methyl cellosolve, ethyl cellosolve, methoxypropylene glycol, dimethoxy propanol, polyethylene glycol, and polyoxyethylene glycerin may be cited. Among them, ethylene glycol is preferable for the solvent. By ethylene glycol, higher-order structure of the conductive polymer is changed, and the initial ESR and further the high temperature characteristic would be excellent. Ethylene glycol may be 50% or more of the liquid.

AS the aprotic organic polar solvent, sulfones, amides, lactones, cyclic amides, nitriles, and oxides may be representatively cited. As the sulfones, dimethylsulfone, ethylmethylsulfone, diethylsulfone, sulfolane, 3-methylsulfone, and 2,4-dimethylsulfolane may be cited. As the amides, N-methylformamide, N,N-dimethylformamide, N-ethylformamide, N,N-diethylformamide, N-methylacetamide, N,N-dimethylacetamide, N-ethylacetamide, N,N-diethyl acetamide, and hexamethylphosphoricamide may be cited. As the lactones and the cyclic amides, γ-butyrolactone, γ-valerolactone, δ-valerolavtone, N-methyl-2-pyrrolidone, ethylene carbonate, propylene carbonate, butylene carbonate, and isobutylene carbonate may be cited. As the nitriles, acetonitrile, 3-methoxypropionitrile, and glutaronitrile may be cited. As the oxides, dimethyl sulfoxide may be cited.

As the organic acid that would be the anion components as the solute, carboxylic acids such as oxalic acid, succinic acid, glutaric acid, pimelic acid, suberic acid, sebacic acid, phthalic acid, isophthalic acid, terephthalic acid, maleic acid, adipic acid, benzoic acid, toluic acid, enanthic acid, malonic acid, 1,6-decanedicarboxylic acid, 1,7-octanedicarboxylic acid, azelaic acid, resorcinic acid, phloroglucinic acid, gallic acid, gentisic acid, protocatechuic acid, pyrocatechuic acid, trimellitic acid, and pyromellitic acid, phenols, and sulfonic acids may be cited. In addition, as the inorganic acids, boric acid, phosphoric acid, phosphorus acid, hypo phosphorus acid, carbonic acid, and silicic acid may be cited. As the composite compoind of organic acid and inorganic acid, borodisalicylic acid, borodioxalic acid, borodimalonic acid, borodisuccinic acid, borodiadipic acid, borodiazelaic acid, borodicarboxylic acid, borodimaleic acid, borodilactic acid, boroditartaric acid, borodicitric acid, borodiphthalic acid, borodi(2-hydroxy)isobutyric acid, borodiresorcinic acid, borodimethylsalicylic acid, borodinaphthoic acid, borodimandelic acid, and borodi(3-hydroxy) propionic acid may be cited.

Furthermore, as the at least one salt of organic acid, inorganic acids, and composite compoind of organic acid and inorganic acid, for example, ammonium salt, quaternary ammonium salt, quaternarized aminidium salt, amine salt, sodium salt, and potassium salt may be cited. As quaternary ammonium ions of the quaternary ammonium salt, tetramethylammonium, triethylmethylammonium, and tetraethylammonium may be cited. As the quaternized aminidium salt, ethyldimethylimidazolium and tetramethylimidazolium may be cited. As the amine salts, primary amine, secondary amine, and tertiary amine may be cited. As the primary amines, methylamine, ethylamine, and propylamine may be cited, as the secondary amine, dimethylamine, diethylamine, ethylmethylamine, and dibutylamine may be cited, and as the tertiary amines, trimethylamine, triethylamine, tributylamine, ethyldimethylamine, and ethyldiisopropylamine may be cited.

In addition, other additives may be added to the liquid. As the additives, alkylene oxide adducts of polyhydric alcohols such as polyethylene glycol and polyethylene glycerin, complex compounds of boric acid and polysaccharide (such as mannitol and sorbitol), complex compounds of boric acid and polyhydric alcohol, boric acid esters, nitro compounds (such as o-nitrobenzoic acid, m-nitrobenzoic acid, p-nitrobenzoic acid, o-nitrophenol, m-nitrophenol, p-nitrophenol, and p-nitrobenzylalcohol), and phosphoric acid esters may be cited. These may be used in single or in combination of two or more. Although the amount of additives is not particularly limited, it is preferable to add the additives in the amount that does not give bad effect to the characteristic of the solid electrolytic capacitor, and for example, the amount is 60 wt % or less in the liquid. Among above additives, the alkylene oxide adducts of polyhydric alcohols, particularly polyethylene glycol or the complex compounds of boric acid and polyhydric alcohol may be preferably added to improve the withstand voltage, and the nitro compounds may be preferably added to absorb gas in the capacitor.

(Ratio of Electrolyte Layer Component)

Firstly, below-described molecular ratio of the cation relative to 1 mol of a functional group which can contribute to the doping reaction of the dopant is a molecular ratio of the cations relative to 1 mol of the functional group which can contribute to the doping reaction among the functional groups of the dopant. All of the functional group which can contribute to the doping reaction of the dopant does not have to be involved in the doping reaction of the conjugated polymer, and for example, a part of the functional group which can contribute to the doping reaction may be doped, and the remaining portion may not be doped. Furthermore, all of the functional group which can contribute to the doping reaction of the dopant may be doped. That is, among the functional groups of the dopant, the molecular ratio of the cation components relative to 1 mol of the functional group which can contribute to the doping reaction is important rather than the functional group involved in the doping reaction. In below, the functional group which can contribute to the doping reaction of the dopant is referred to as a doping-capable functional group. Also, the cation components are simply called the cations.

In the electrolyte solution, the molecular ratio of cations relative to 1 mol of doping-capable functional groups is set to be 6 or less. By this range, ESR of the solid electrolytic capacitor can be suppressed low even after a loading of heat stress. The loading of heat stress indicates all situations in which the heat stress is loaded to the solid electrolytic capacitor, such as at the time of a reflow process and the usage of the solid electrolytic capacitor under high temperature environment.

Although not limited, the reason why ESR can be suppressed low when the molecular ratio of cations relative to 1 mol of the doping-capable functional group is set to be or less is assumed as follows. That is, the cation components neutralize the dopant and transfers the conductive polymer from bipolaron to polaron, such that the conductivity of the conductive polymer is improved and ESR of the solid electrolyte capacitor is decreased. Furthermore, The heat stress produces a first phenomenon of transferring the conductive polymer from bipolaron to polaron by facilitating the neutralization action of the dopant by the cation components, and a second phenomenon of facilitating the dedoping reaction of the dopant by facilitating the action of the cation components to the dopant. Then, it is assumed that a balance of the first phenomenon and the second phenomenon is related to the molecular ratio of cations relative to 1 mol of the doping-capable functional group.

As a result, it is assumed that, if the molecular ratio of cations relative to 1 mol of the doping-capable functional group is more than 3.5 and 6 or less, the second phenomenon by the loading of heat stress is relatively suppressed so that the effect of the first phenomenon by the loading of heat stress remains, and the conductive polymer is transferred from bipolaron to polaron. In contrast, if said molecular ratio is more than 6, the second phenomenon becomes largely superior, and as a result, ESR after the loading of heat stress becomes large.

In particular, if ethylene glycol is included in the solvent of the liquid, in the electrolyte layer, the molecular ratio of cations relative to 1 mol of the doping-capable functional group is preferably 3.5 or less. If said molecular ratio is more than 2.8 and 3.5 or less, the effect of the first phenomenon by the loading of heat stress becomes large, and the increase in ESR of the solid electrolytic capacitor after the loading of heat stress is suppressed lower in the range of more than 3.5 and 6 or less, and as a result, ESR of the solid electrolytic capacitor after the loading of heat stress is further suppressed lower. Furthermore, if ethylene glycol is included in the solvent of the liquid, the molecular ratio of cations relative to 1 mol of the doping-capable functional group is preferably more than 2.5 and 2.8 or less. If said molecular ratio is more than 2.5 and 2.8 or less, the first phenomenon and the second phenomenon by the loading of heat stress competes so that ESR of the solid electrolytic capacitor does not change between before and after the loading of heat stress, and as a result, ESR of the solid electrolytic capacitor after the loading of heat stress can be further suppressed lower.

Furthermore, if ethylene glycol is included in the solvent of the liquid, the molecular ratio of cations relative to 1 mol of the doping-capable functional group is preferably 2.5 or less. If said molecular ratio is 2.5 or less, the first phenomenon by the loading of heat stress would act superior than the second phenomenon, and ESR after the loading of heat stress is suppressed equally or lower relative to ESR before the loading of heat stress.

In addition, if γ-butyrolactone is included in the solvent of the liquid, the molecular ratio of cations relative to 1 mol of the doping-capable functional group is preferably 1.4 or less. If said molecular ratio is 1.4 or less, the first phenomenon and the second phenomenon by the loading of heat stress competes so that ESR of the solid electrolytic capacitor does not change between before and after the loading of heat stress, and as a result, ESR of the solid electrolytic capacitor after the loading of heat stress can be further suppressed lower.

Here, the cation component included in the electrolyte layer is a total amount of cation component included in the electrolyte layer regardless of whether it is from the liquid or the solid electrolyte layer. In detail, if the cation component is included in the electrolyte layer and is not included in the liquid, the cation component included in the electrolyte layer is the cation component from the solid electrolyte layer, and the total amount of cation component from the solid electrolyte layer is defined relative to 1 mol of the doping-capable functional group. Furthermore, if the cation component is not included in the electrolyte layer and is included in the liquid, the cation component included in the liquid is the cation component from the liquid, and the total amount of cation component from the liquid is defined relative to 1 mol of the doping-capable functional group. In addition, if the cation component is included in both the electrolyte layer and the liquid, the total amount of the cation component from the solid electrolyte layer and the cation component from the liquid is defined as the cation component included in the electrolyte layer relative to 1 mol of the doping-capable functional group which can contribute to the doping reaction of the dopant. Moreover, the cation component may not be included in the electrolyte layer and may be zero.

The doping-capable functional group are not particularly limited, and organic acid, sulfo group, carboxy group, and hydroxy group, etc., may be cited. Here, by adding small amount of acceptors which easily receives electrons or donors which easily donates electrons, to the conjugated polymers, the conductivity is expressed. When the acceptors or the donors are added to the conjugated polymers, π electrons are extracted from the conjugates polymers to form negative charge carriers (electron holes or holes) in the case the acceptors are added, and electrons are supplied to form the negative charge carriers in the case the donors are added, expressing the conductivity.

Note that, in the electrolyte layer, the anion components and the cation components may be included in equal amount, or the anion components may be included excessively compared to the cation components, or the cation components may be included excessively compared to the anion components. That is, the molecular ratio of the acid component and the base component in the electrolyte layer may be arbitrary. As long as the cation components included in the electrolyte layer are defined relative to 1 mol of the doping-capable functional group, ESR of the solid electrolytic capacitor after the loading of head stress can be suppressed low even if the amount of the anion components and the cation components is equivalent, or it is anion components excessive or cation component excessive.

(Separator)

Separators may be celluloses such as kraft, manila hemp, esparto, hemp, rayon, and combinations thereof, polyester resins such as polyethylene terephthalate, polybutylene terephthalate, polyethylene naphthalate, and derivatives thereof, polytetrafluoroethylene resins, polyvinylidene fluoride resins, vinylon resins, polyamide resins such as aliphatic polyamide, semi-aromatic polyamide, and fully aromatic polyamide, polyimide resins, polyethylene resins, polypropylene resins, trimethylpentane resins, polyphenylene sulfide resins, acryl resins, and polyvinyl alcohol resins, and these resins may be used in single or in combination.

EXAMPLES

In below, the present disclosure is further described in detail based on examples. Note that the present disclosure is not limited to the following examples.

Solid electrolytic capacitors of examples 1 to 26 and comparative examples 1 and 2 were produced by changing amounts of the cation components and the anion components in the electrolyte layer, and the loading of heat stress by the reflow process or by abandonment under high temperature environment was given to the examples, and the ESR before and after the loading of heat stress was measured. Common points among each solid electrolytic capacitor were as follows.

That is, the anode foil was an aluminum foil, the surface thereof was enlarged by the etching process, and the dielectric oxide film was formed thereon by the chemical treatment. The cathode foil was a plane foil that is an aluminum foil to which the etching process had not been performed. The lead wires were connected to the anode foil and the cathode foil, respectively, and the anode foil and the cathode foil were set to face each other and were wound via the manila separator. In this way, the capacitor element with diameter of 6.1 mm×height of 6.3 mm was formed. This capacitor element was immersed in the ammonium dihydrogen ammonium solution for 10 minutes to perform restoration chemical treatment.

Next, polyethylene dioxythiophene (PEDOT) to which polystyrene sulfonic acid (PSS) had been doped was prepared, and the cation components were added according to each of the examples and the comparative examples. Sodium hydroxide was used as the cation components in examples 16 to 20 and comparative example 2, and triethylamine was used as the cation components in examples 21 to 24. The capacitor element was immersed in this dispersion, and was drawn out and dried for 30 minutes at 150° C. The immersion and drying were repeated for several times. In this way, the solid electrolyte layer was forms on the capacitor element.

Furthermore, azelaic acid that would be the anion components and triethylamine that would be the cation components were added to ethylene glycol to produce the liquid. Then, the capacitor element on which the solid electrolyte layer had been formed was immersed in the liquid. This capacitor element was inserted into an outer case with bottom, a sealing rubber was fit to an opening of the outer case, and the outer case was sealed by fastening process.

Aging process was performed to each solid electrolytic capacitor by applying voltage. Rated capacity of produced solid electrolytic capacitors were 47 µF. ESR of these solid electrolytic capacitors before the loading of heat stress was measure at 20° C. which is room temperature. Then, the reflow process at peak temperature of 260° C. was performed to examples 1 to 24 and 26 and comparative examples 1 and 2 to check the effect by the loading of heat stress, and after being left at room temperature, ESR after the loading of heat stress by the reflow process was measured. In addition, example 25 was left for 60 hours at 150° C., and was left at room temperature, and ESR after the loading of heat stress by the abandonment under high temperature environment was measured.

Here, PSS used as the dopant was the same for all solid electrolytic capacitors. As shown in below Table 1, produced solid electrolytic capacitors had different amount of the cation components included in the solid electrolyte layer, different amount of the anion components included in the electrolytic solution (the liquid), and different amount of the cation components included in the electrolytic solution (the liquid). Therefore, as shown in the below Table 1, the molecular ratio of the cation components relative to 1 mol of the doping-capable functional group were different. The component ratios is shown in the below Table 1 together with ESR of each of the solid electrolytic capacitors before and after the reflow process. In Table 1, "liquid" indicates "electrolytic solution".

TABLE 1

| | Cations added to Solid Electrolyte Layer | Composition of Electrolytic Solution | | Cations added to Electrolytic Solution | Total Amount In Electrolyte Layer | | |
|---|---|---|---|---|---|---|---|
| | Molecular Ratio of Cation Component relative to 1 mol of Doping-Capable Functional Group | Amount of Anion Component relative to 100 g of Electrolytic Solution [mmol] | Amount of Cation Component relative to 100 g of Electrolytic Solution [mmol] | Molecular Ratio of Cation Component relative to 1 mol of Doping-Capable Functional Group | Molecular Ratio of Cation Component relative to 1 mol of Doping-Capable Functional Group | ESR[Ω/100 kHz] | |
| | | | | | | Before Loading of Heat Stress | After Loading of Heat Stress |
| Example 1 | 0 | 17 | 0 | 0 | 0 | 1.34 | 0.21 |
| Example 2 | 0 | 17 | 2 | 0.4 | 0.4 | 0.84 | 0.17 |
| Example 3 | 0 | 17 | 4 | 0.7 | 0.7 | 0.86 | 0.19 |
| Example 4 | 0 | 17 | 6 | 1.1 | 1.1 | 0.44 | 0.17 |
| Example 5 | 0 | 17 | 8 | 1.4 | 1.4 | 0.50 | 0.19 |
| Example 6 | 0 | 17 | 13 | 2.1 | 2.1 | 0.27 | 0.22 |

TABLE 1-continued

| | Cations added to Solid Electrolyte Layer | Composition of Electrolytic Solution | | Cations added to Electrolytic Solution | Total Amount In Electrolyte Layer | ESR[Ω/100 kHz] | |
|---|---|---|---|---|---|---|---|
| | Molecular Ratio of Cation Component relative to 1 mol of Doping-Capable Functional Group | Amount of Anion Component relative to 100 g of Electrolytic Solution [mmol] | Amount of Cation Component relative to 100 g of Electrolytic Solution [mmol] | Molecular Ratio of Cation Component relative to 1 mol of Doping-Capable Functional Group | Molecular Ratio of Cation Component relative to 1 mol of Doping-Capable Functional Group | Before Loading of Heat Stress | After Loading of Heat Stress |
| Example 7 | 0 | 17 | 15 | 2.5 | 2.5 | 0.21 | 0.23 |
| Example 8 | 0 | 17 | 17 | 2.8 | 2.8 | 0.16 | 0.25 |
| Example 8-2 | 0 | 17 | 17 | 5.6 | 5.6 | 0.11 | 2.48 |
| Example 9 | 0 | 17 | 21 | 3.5 | 3.5 | 0.12 | 0.67 |
| Example 10 | 0 | 17 | 25 | 4.2 | 4.2 | 0.09 | 1.09 |
| Example 11 | 0 | 17 | 29 | 4.9 | 4.9 | 0.09 | 1.80 |
| Example 12 | 0 | 17 | 33 | 5.6 | 5.6 | 0.10 | 2.51 |
| Example 26 | 0 | 17 | 35 | 5.8 | 5.8 | 0.10 | 3.21 |
| Comparative Example 1 | 0 | 17 | 50 | 8.4 | 8.4 | 0.13 | 6.37 |
| Example 13 | 0 | 0 | 17 | 2.8 | 2.8 | 0.17 | 0.26 |
| Example 14 | 0 | 4 | 17 | 2.8 | 2.8 | 0.17 | 0.28 |
| Example 15 | 0 | 67 | 17 | 2.8 | 2.8 | 0.15 | 0.24 |
| Example 16 | 0.2 | 17 | 0 | 0 | 0.2 | 0.14 | 0.13 |
| Example 17 | 0.2 | 17 | 4 | 0.7 | 0.09 | 0.22 | 0.16 |
| Example 18 | 0.2 | 17 | 8 | 1.4 | 1.6 | 0.20 | 0.21 |
| Example 19 | 0.2 | 17 | 17 | 2.8 | 3.0 | 0.14 | 0.50 |
| Example 20 | 0.2 | 17 | 33 | 5.6 | 5.8 | 0.09 | 4.34 |
| Comparative Example 2 | 0.2 | 17 | 66 | 11.2 | 11.4 | 0.16 | 8.98 |
| Example 21 | 0.2 | 0 | 0 | 0 | 0.2 | 0.13 | 0.11 |
| Example 22 | 0.5 | 0 | 0 | 0 | 0.5 | 0.11 | 0.12 |
| Example 23 | 0.6 | 0 | 0 | 0 | 0.6 | 0.13 | 0.12 |
| Example 24 | 1.0 | 0 | 0 | 0 | 1.0 | 0.10 | 0.13 |
| Example 25 | 0 | 17 | 17 | 2.8 | 2.8 | 0.16 | 0.24 |

As shown in Table 1, as for examples 1 to 12 and 26 and comparative example 1, the cation component was not added to the solid electrolyte layer, the amount of anion components in the liquid was fixed, and the amount of cation components in the liquid was changed from non-present to equivalent and then to excessive, relative to the amount of anion components. In examples 13 to 15, the cation component was not added to the solid electrolyte layer, the amount of cation components in the liquid was fixed, and the amount of anion components in the liquid was changed from non-present to excessive, relative to the amount of cation components. In examples 16 to 20 and comparative example 2, the amount of cation component in the solid electrolyte layer was fixed, the amount of anion components in the liquid was fixed, and the amount of cation components in the liquid was changed from non-present to equivalent and then to excessive, relative to the amount of anion components. In examples 21 to 24, the amount of cation components in the solid electrolyte layer was changed, and the anion components and the cation components were not added to the liquid.

Here, except for example 8-2, the amount of the liquid (electrolytic solution) immersed to the capacitor element was the same in all of examples and comparative examples. Example 8-2 was the same as example 8 except that the amount of the electrolytic solution was twice that of example 8. That is, the amounts of the anion components and the cation components relative to 100g of the electrolytic solution were both 17 mmol, which is the same as example 8. However, the molecular ratio of the cation components relative to 1 mol of the doping-capable functional group in all electrolyte layer of example 8 was 2.8, and the molecular ratio of the cation components relative to 1 mol of the doping-capable functional group in all electrolyte layer of example 8-2, in which the amount of the electrolytic solution was twice as much, was 5.6. Although the production method for example 25 was the same as example 8, example 25 was left for 60 hours at 150° C. instead of the reflow process, for the loading of heat stress.

Figure 2:
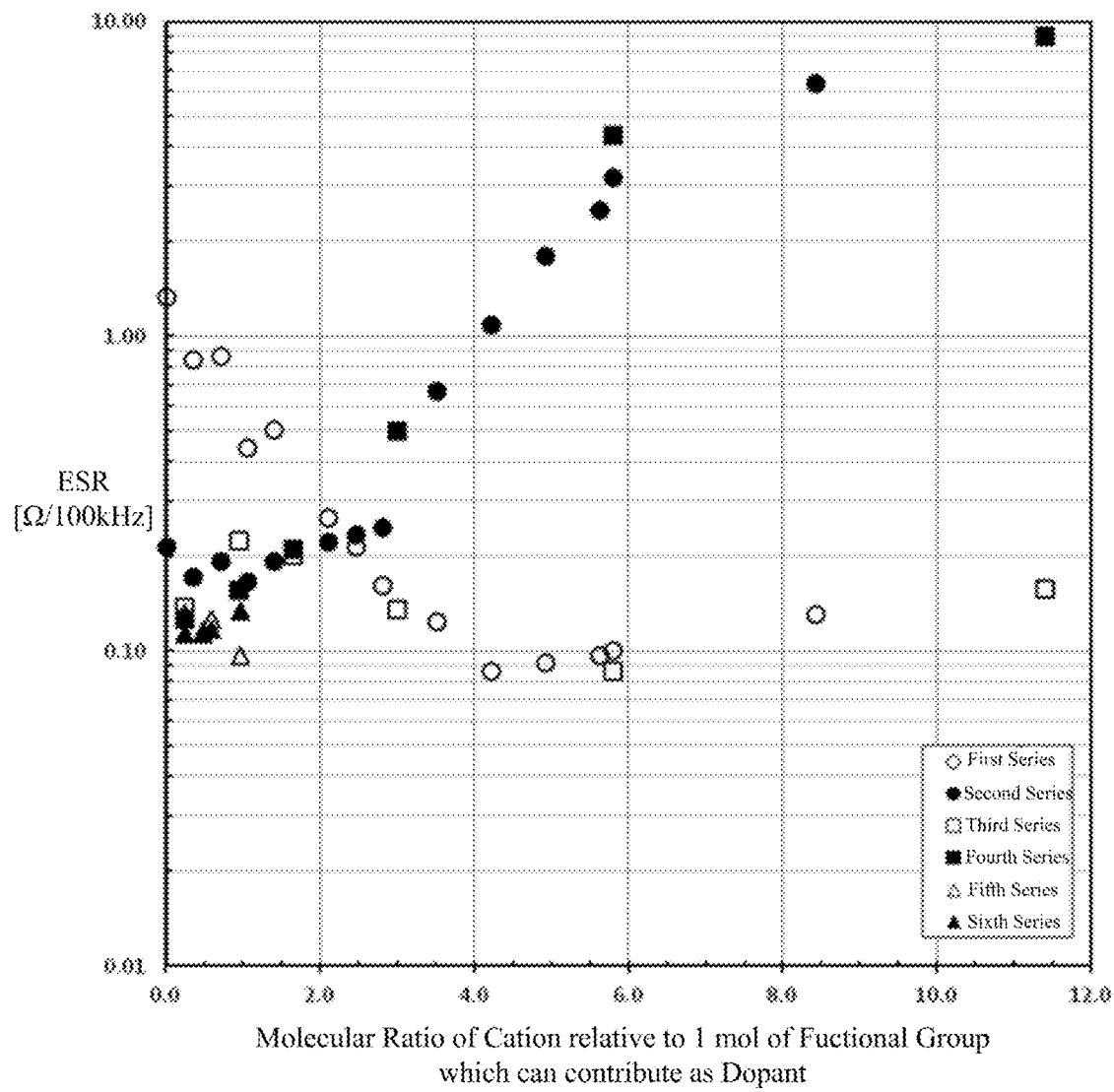
FIG. 2 is a graph illustrating a relationship between ESR before and after the reflow, and a molecular ratio of the cation component relative to 1 mol of a functional group which can contribute to a doping reaction of a dopant, according to ethylene glycol.

Furthermore, In FIG. 2 is a graph illustrating a relationship between ESR before and after the reflow in Table 1, and a molecular ratio of the cation component relative to 1 mol of a functional group. In FIG. 2, a first series shows the change in ESR before the reflow and is a series that includes examples 1 to 12 (except example 8-2) and 26 and comparative example 1, in which the anion components in the liquid was fixed. A second series is shows change in ESR after the reflow of the first series, and is a series that includes examples 1 to 12 (except example 8-2) and comparative example 1, in which the anion components in the liquid was fixed. A third series shows the change in ESR before the reflow and is a series that includes examples 16 to 20 and comparative example 2, in which the amount of the cation components in the solid electrolyte layer was fixed. A fourth series shows the change in ESR after the reflow of the third series and is a series that includes examples 16 to 20 and comparative example 2, in which the amount of the cation components in the solid electrolyte layer was fixed. A fifth series shows the change in ESR before the reflow and is a series that includes examples 21 to 24, in which the amount of the anion components and the cation components in the liquid was fixed. A sixth series shows the change in ESR after the reflow of the fifth series and is a series that includes examples 21 to 24 in which the amount of the anion components and the cation components in the liquid was fixed.

Figure 3:
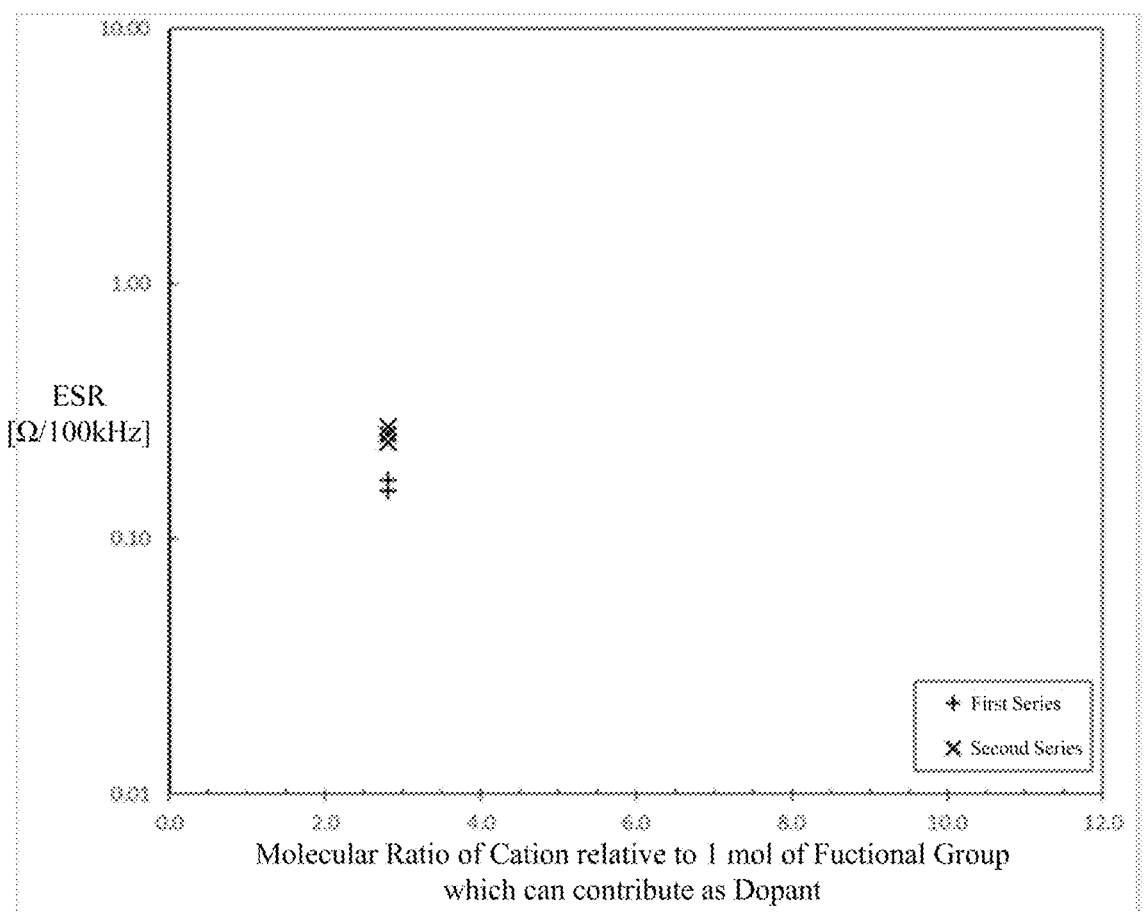
FIG. 3 is a graph illustrating a relationship between ESR before and after the reflow, and a molecular ratio of the cation component relative to 1 mol of a functional group which can contribute to a doping reaction of a dopant, according to ethylene glycol.

FIG. 3 is a graph illustrating a relationship between ESR before and after the reflow of Table 1, and the molecular ratio of the cation component relative to 1 mol of the functional group which can contribute to the dopant. In FIG. 3, the first series shows the change in ESR before the reflow and is a series that includes examples 13 to 15, in which the cation components in the electrolyte layer is fixed and the anion components in the liquid was changed. In FIG. 3, the second series in shows the change in ESR after the reflow of the first series and is a series that includes examples 13 to 15, in which the cation components in the electrolyte layer is fixed and the anion components in the liquid was changed.

As understood from examples 1 to 12 (except example 8-2) and 26 and comparative example 1 in Table 1, and the second series in FIG. 2, it was found that ESR of the solid electrolytic capacitor after the reflow became high according to the increase in the cation components, and not to the amount of the anion components. As understood from examples 13 to 15 of Table 1, and FIG. 3, it was found that ESR of the solid electrolytic capacitor after the reflow did not change when the amount of cation components was fixed even when the amount of the anion components was changed.

Furthermore, as understood by comparison between the first series to the fourth series in FIG. 2, in the first series and the second series, and the third series and the fourth series, behaviors of the change in ESR before and after the reflow relative to the change in the amount of the cation components were similar, and it was found that ESR was changed according to the total amount of the cation components in the electrolyte layer, regardless of whether the cation components is from the solid electrolyte layer or from the liquid.

In addition, as shown in Table 1 and FIGS. 1 and 2, the molecular ratio of the cations relative to 1 mol of the doping-capable functional group was 2.5 or less, it was found that ESR after the reflow was equivalent or became lower relative to ESR before the reflow. Furthermore, if the molecular ratio of the cations relative to 1 mol of the doping-capable functional group was more than 2.5 and 2.8 or less, ESR of the solid electrolytic capacitor before and after the reflow did not change, and as a result, ESR of the solid electrolytic capacitor after the loading of heat stress could be maintained to be further low. Furthermore, if the molecular ratio of the cations relative to 1 mol of the doping-capable functional group was more than 2.8 and 3.5 or less, increase in ESR of the solid electrolytic capacitor before and after the loading of heat stress was suppressed, and as a result, ESR of the solid electrolytic capacitor after the loading of heat stress could be maintained to be further low. In addition, if the molecular ratio of the cations relative to 1 mol of the doping-capable functional group was more than 3.5 and 6 or less, it was found that ESR after the loading of heat stress was suppressed for about 40% when compared to comparative example 1, even though ESR became higher as the cation components increased.

Moreover, in example 8-2, the amounts of the anion components and the cation components relative to 100g of the electrolytic solution were both 17 mmol, which was the same as example 8, however, the amount of the electrolytic solution was twice that of example 8, so that the molecular ratio of the cation components relative to 1 mol of the doping-capable functional group in all electrolyte layer was 5.6, which was the same as example 12. As shown in Table 1, ESR after the loading of heat stress in this example 8-2 was the same as example 12. As a result, it was found that ESR after the loading of heat stress would be the same even when concentration of the cation components or the amount of the electrolytic solution had been changed if the total amount of the cation components in the electrolyte later was the same.

Additionally, as shown in Table 1, although the production methods for examples 8 and 25 were the same, the loading methods of heat stress were different. The reflow process was performed in example 8, and in example 25, the reflow process was not performed and example 25 was left for 60 hours at 150° C. ESR after the loading of heat stress of examples 8 and 25 was the same, and it was found that the same result could be obtained by the loading time of heat stress even when the loading method and temperature of heat stress were different.

Note that, in FIG. 2, in the third series and the fifth series, the reason why ESR before and after the loading of heat stress had been the same when the molecular ratio of the cation components relative to 1 mol of the doping-capable functional group was 2.5 or less is because the effect of the cation components to the dopant had been facilitated by giving the heat stress in the drying process at the time of forming the solid electrolyte layer, such that the conductivity of the conductive polymer was improved.

Further, the solid electrolytic capacitors of examples 27 to 32 and comparative examples 3 to 5 were produced, the reflow process was performed to give the loading of heat stress, and ESR before and after the loading of heat stress was measured. The result is shown in below Table 2 together with types of the solute and the component ratio.

TABLE 2

| | Cations added to Solid Electrolyte Layer | Composition of Electrolytic Solution | | | | Total Amount In Electrolyte Layer | ESR[Ω/100 kHz] | |
|---|---|---|---|---|---|---|---|---|
| | Molecular Ratio of Cation Component relative to 1 mol of Doping-Capable Functional Group | Type of Anion | Amount of Anion Component relative to 100 g of Electrolytic Solution [mmol] | Type of Cation | Amount of Cation Component relative to 100 g of Electrolytic Solution [mmol] | Amount of Cation Component relative to 100 g of Electrolytic Solution [mmol] | Before Loading of Heat Stress | After Loading of Heat Stress |
| Example 27 | 0 | Benzoic Acid | 17 | Diethylamine | 17 | 2.8 | 0.18 | 0.27 |
| Example 28 | 0 | | 17 | | 35 | 5.8 | 0.10 | 3.58 |
| Comparative Example 3 | 0 | | 17 | | 50 | 8.4 | 0.15 | 6.89 |

TABLE 2-continued

| | Cations added to Solid Electrolyte Layer | Composition of Electrolytic Solution | | | | Total Amount In Electrolyte Layer | ESR[Ω/100 kHz] | |
|---|---|---|---|---|---|---|---|---|
| | Molecular Ratio of Cation Component relative to 1 mol of Doping-Capable Functional Group | Type of Anion | Amount of Anion Component relative to 100 g of Electrolytic Solution [mmol] | Type of Cation | Amount of Cation Component relative to 100 g of Electrolytic Solution [mmol] | Amount of Cation Component relative to 100 g of Electrolytic Solution [mmol] | Before Loading of Heat Stress | After Loading of Heat Stress |
| Example 29 | 0 | 1,6-decane dicarboxylic acid | 17 | Ethyldimethylamine | 17 | 2.8 | 0.17 | 0.26 |
| Example 30 | 0 | | 17 | | 33 | 5.8 | 0.12 | 3.42 |
| Comparative Example 4 | 0 | | 17 | | 50 | 8.4 | 0.14 | 6.76 |
| Example 31 | 0 | Phthalic acid | 17 | Trimethylamine | 17 | 2.8 | 0.14 | 0.23 |
| Example 32 | 0 | | 17 | | 33 | 5.8 | 0.10 | 3.08 |
| Comparative Example 5 | 0 | | 17 | | 50 | 8.4 | 0.11 | 6.23 |

As shown in Table 2, the types of the solute were different between examples 27 to 32 and comparative examples 3 to 5, and examples 1 to 26 and comparative examples 1 and 2. In examples 27 and 28 and comparative example 3, benzoic acid was used as the anion components and diethylamine was used as the cation components. In examples 20 and 30 and comparative example 4, 1,6-decanedicarboxylic acid was used as the anion components and ethyldimethylamine was used as the cation components. In examples 31 and 32 and comparative example 5, phthalic acid was used as the anion components and trimethylamine was used as the cation components. In examples 27 to 32 and comparative examples 3 to 5, the cation component was not added to the solid electrolyte layer, the amount of the anion components in the liquid was fixed, and the anion components in the liquid was changed for each group having same types of the solute. Other production method of the solid electrolytic capacitors was all same as the examples 1 to 26 and comparative examples 1 and 2.

Figure 4:
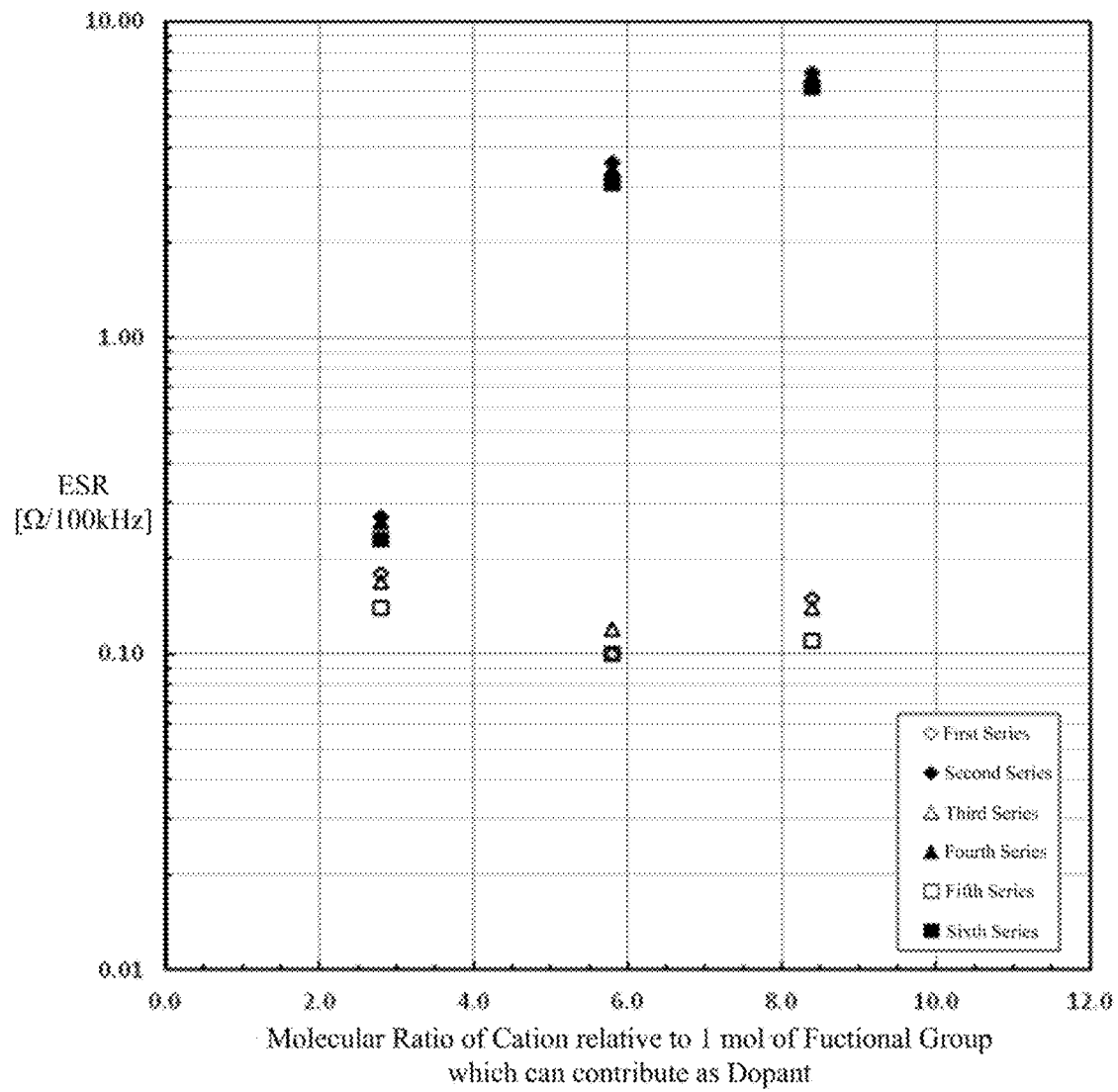
FIG. 4 is a graph for different types of solutes illustrating a relationship between ESR before and after the reflow, and a molecular ratio of the cation component relative to 1 mol of a functional group which can contribute to a doping reaction of a dopant, according to ethylene glycol.

FIG. 4 is a graph illustrating a relationship between ESR before and after the reflow in Table 2, and the molecular ratio of the cation components relative to 1 mol of the doping-capable functional group. In FIG. 3, the first series shows the change in ESR before the reflow and is a series that includes examples 27 and 28 and comparative example 3. The second series shows the change in ESR after the reflow of examples 27 and 28 and comparative example 3 included in the first series. The third series shows the change in ESR before the reflow and is a series that includes examples 29 and 30 and comparative example 4. The fourth series shows the change in ESR after the reflow of examples 29 and 30 and comparative example 4 included in the third series. The fifth series shows the change in ESR before the reflow and is a series that includes examples 31 and 32 and comparative example 5. The sixth series shows the change in ESR after the reflow of examples 31 and 32 and comparative example 5 included in the fifth series.

As understood from Table 2 and FIG. 4, it was found that ESR of the solid electrolytic capacitor changes according to the total amount of the cation components in the electrolyte layer regardless of the types of the anion components and the cation components.

Furthermore, if the molecular ratio of the cations relative to 1 mol of the doping-capable functional group was more than 2.5 and 2.8 or less, ESR of the solid electrolytic capacitor before and after the reflow did not change, and as a result, it was found that ESR of the solid electrolytic capacitor after the loading of heat stress could be maintained to be further low. In addition, if the molecular ratio of the cations relative to 1 mol of the doping-capable functional group was more than 3.5 and 6 or less, it was found that ESR after the loading of heat stress was significantly suppressed when compared to comparative examples, even though ESR after the loading of heat stress became higher as the cation components increased.

Thus, ESR of the solid electrolytic capacitor after the loading of heat stress relates to the amount of the cation components in the electrolyte layer relative to 1 mol of the doping-capable functional group, and if the molecular ratio of the cation components is 6 or less, ESR after the loading of heat stress would be excellent, if the molecular ratio of the cation components is 3.5 or less, the increase in ESR after the loading of heat stress can be suppressed, if the molecular ratio of the cation components is 2.8 or less, ESR after the loading of heat stress can be maintained low, and if the molecular ratio of the cation components is 2.5 or less, ESR after the loading of heat stress can be suppressed lower than ESR before the loading of heat stress. Therefore, this result is not depending on the types of the cation components and the anion components.

Furthermore, examples 33 to 41 and comparative examples 6 and 7, in which the solute included in the liquid filled in the air gaps of the capacitor element on which the solid electrolyte layer is formed was changed from ethylene glycol to γ-butyrolactone, were produced. The common points of the solid electrolytic capacitor of examples 33 to 41 and comparative examples 6 and 7 were the same as the commo points of examples 1 to 26 and comparative example 1 and 2, except that the liquid included γ-butyrolactone. That is, the liquid was produced by adding azelaic acid that would be the anion components and triethylamine that would be the cation components to γ-butyrolactone, and the solid electrolyte layer is formed by polyethylene dioxythiophene (PEDOT) to which polystyrene sulfonic acid (PSS).

As for the solid electrolytic capacitor of examples 33 to 41 and comparative examples 6 and 7, the aging process was performed by applying voltage, and ESR before the loading of heat stress was measured at 20° C. that is room temperature. Then, for the solid electrolytic capacitor of examples 33 to 41 and comparative examples 6 and 7, the reflow process at peak temperature of 260° C. was performed to check the effect by the loading of heat stress, and after being left at room temperature, ESR after the loading of heat stress by the reflow process was measured.

Here, as shown in below Table 3, in the solid electrolytic capacitor of examples 33 to 41 and comparative examples 6 and 7, the amount of the anion components included in the electrolytic solution (the liquid) and the amount of the cation components included in the electrolytic solution (the liquid) were different, and therefore, the molecular ratio of the cation components relative to 1 mol of the doping-capable functional group was different. The components ratio were shown in below Table 3 together with ESR of the solid electrolytic capacitor before and after the reflow. In Table 3, "liquid" indicates "electrolytic solution".

the molecular ratio of the cations relative to 1 mol of the doping-capable functional group was 6 or less, it was found that ESR after the loading of heat stress was suppressed for about 75% when compared to comparative example 7, even though ESR became higher as the cation components increased. In addition, as shown in Table 3 and FIG. 5, if the molecular ratio of the cations relative to 1 mol of the doping-capable functional group was 1.4 or less, ESR of the solid electrolytic capacitor before and after the loading of heat stress did not change, and as a result, it was found that ESR of the solid electrolytic capacitor after the loading of heat stress could be maintained to be further low.

From above, ESR of the solid electrolytic capacitor after the loading of heat stress relates to the amount of the cation components in the electrolyte layer relative to 1 mol of the doping-capable functional group regardless of the types of the solute included in the liquid, and if the molecular ratio

TABLE 3

| | Cations added to Solid Electrolyte Layer | Composition of Electrolytic Solution | | Cations added to Solid Electrolyte Layer | Total Amount In Electrolyte Layer | | |
|---|---|---|---|---|---|---|---|
| | Molecular Ratio of Cation Component relative to 1 mol of Doping-Capable Functional Group | Amount of Anion Component relative to 100 g of Electrolytic Solution [mmol] | Amount of Cation Component relative to 100 g of Electrolytic Solution [mmol] | Molecular Ratio of Cation Component relative to 1 mol of Doping-Capable Functional Group | Molecular Ratio of Cation Component relative to 1 mol of Doping-Capable Functional Group | ESR[Ω/100 kHz] | |
| | | | | | | Before Loading of Heat Stress | After Loading of Heat Stress |
| Example 33 | 0 | 17 | 0 | 0 | 0 | 4.04 | 2.33 |
| Example 34 | 0 | 17 | 2 | 0.4 | 0.4 | 3.34 | 1.65 |
| Example 35 | 0 | 17 | 4 | 0.7 | 0.7 | 1.91 | 1.21 |
| Example 36 | 0 | 17 | 6 | 1.1 | 1.1 | 1.25 | 1.08 |
| Example 37 | 0 | 17 | 8 | 1.4 | 1.4 | 0.89 | 1.16 |
| Example 38 | 0 | 17 | 13 | 2.1 | 2.1 | 0.51 | 1.34 |
| Example 39 | 0 | 17 | 17 | 2.8 | 2.8 | 0.33 | 1.60 |
| Example 40 | 0 | 17 | 25 | 4.2 | 4.2 | 0.32 | 2.66 |
| Example 41 | 0 | 17 | 33 | 5.6 | 5.6 | 0.35 | 3.79 |
| Comparative Example 6 | 0 | 17 | 50 | 8.4 | 8.4 | 0.40 | 4.92 |
| Comparative Example 7 | 0 | 17 | 66 | 11.3 | 11.2 | 0.48 | 5.05 |

Figure 5:
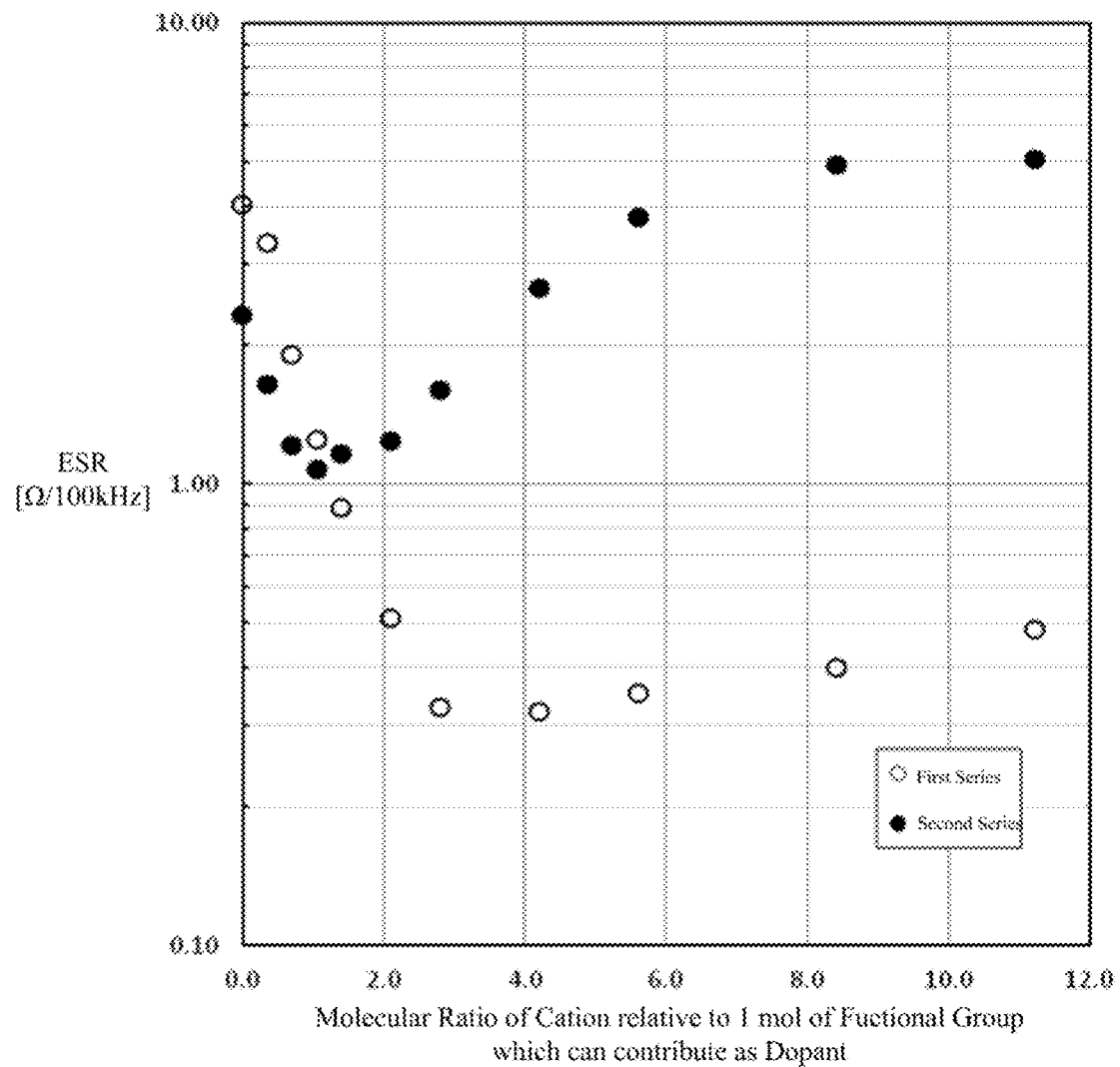
FIG. 5 is a graph illustrating a relationship between ESR before and after the reflow, and a molecular ratio of the cation component relative to 1 mol of a functional group which can contribute to a doping reaction of a dopant, according to γ-butyrolactone.

As shown in Table 3, in examples 33 to 41 and comparative examples 6 and 7, the cation component was not added to the solid electrolyte layer, the amount of anion components in the liquid was fixed, and the amount of cation components in the liquid was changed from non-present to equivalent and then to excessive, relative to the amount of anion components. FIG. 5 is a graph illustrating a relationship between ESR before and after the reflow in Table 3, and the molecular ratio of the cation components relative to 1 mol of the doping-capable functional group. In FIG. 5, the first series shows the change in ESR before the reflow and is a series that includes examples 33 and 41 and comparative examples 6 and 7, in which the anion components in the liquid was fixed. The second series shows the change in ESR after the reflow in the first series, and is a series that includes examples 33 and 41 and comparative examples 6 and 7, in which the anion components in the liquid was fixed.

As understood from Table 3 and the second series in FIG. 5, it was found that ESR of the solid electrolytic capacitor after the reflow became high according to the increase in the cation components, even when the liquid included γ-butyrolactone. Furthermore, as shown in Table 3 and FIG. 5, if of the cation components is 6 or less, ESR after the loading of heat stress would be excellent.

Although the dispersion of the conductive polymers that does not include additives such as polyhydric alcohol was used in the present examples, the present disclosure is not limited thereto. Even if the polyhydric alcohol is added to the dispersion of the conductive polymer, the tendency of the change in ESR before and after the loading of heat stress would be the same as the case in which polyhydric alcohol are not added. Value of ESR can be reduced for about one digit by adding polyhydric alcohol to the dispersion of the conductive polymer used in the present examples.

The invention claimed is:

1. A solid electrolytic capacitor comprising:
   a capacitor element formed by opposing an anode foil and a cathode foil; and
   an electrolytic layer formed in the capacitor element, wherein:
   the electrolytic layer includes:
   a solid electrolyte layer including a dopant and a conjugated polymer; and a liquid filled in air gaps in the capacitor element on which the solid electrolyte layer is formed, and a molecular ratio of a cation component relative to 1 mol of a functional group which can contribute to a doping reaction of the dopant, in the electrolytic layer is at least 0.2 and is 6 or less.

2. The solid electrolytic capacitor according to claim 1, wherein:

the cation component is included only in the liquid, and the molecular ratio of the cation component relative to 1 mol of the functional group is 6 or less.

3. The solid electrolytic capacitor according to claim 2, wherein the molecular ratio of the cation component relative to 1 mol of the functional group in the electrolytic layer is at least 0.2 and is 3.5 or less.

4. The solid electrolytic capacitor according to claim 2, wherein the molecular ratio of the cation component relative to 1 mol of the functional group in the electrolytic layer is at least 0.2 and is 2.8 or less.

5. The solid electrolytic capacitor according to claim 1, wherein:

the cation component is included in both the solid electrolyte layer and the liquid, and the molecular ratio of a total of the cation component in the solid electrolyte layer and the liquid relative to 1 mol of the functional group is 6 or less.

6. The solid electrolytic capacitor according to claim 5, wherein the molecular ratio of the cation component relative to 1 mol of the functional group in the electrolytic layer is at least 0.2 and is 3.5 or less.

7. The solid electrolytic capacitor according to claim 5, wherein the molecular ratio of the cation component relative to 1 mol of the functional group in the electrolytic layer is at least 0.2 and is 2.8 or less.

8. The solid electrolytic capacitor according to claim 1, wherein the molecular ratio of the cation component relative to 1 mol of the functional group in the electrolytic layer is at least 0.2 and is 3.5 or less.

9. The solid electrolytic capacitor according to claim 1, wherein the molecular ratio of the cation component relative to 1 mol of the functional group in the electrolytic layer is at least 0.2 and is 2.8 or less.

10. The solid electrolytic capacitor according to claim 1, wherein the dopant is polystyrene sulfonic acid.

11. The solid electrolytic capacitor according to claim 1, wherein the liquid is ethylene glycol, γ-butyrolactone, or both.

12. The solid electrolytic capacitor according to claim 11, wherein 50% or more of the liquid is ethylene glycol.

* * * * *